United States Patent [19]
Phillips, II

[11] Patent Number: 4,929,001
[45] Date of Patent: May 29, 1990

[54] TUBULAR CONNECTOR
[75] Inventor: Ronald W. Phillips, II, Doylestown, Pa.
[73] Assignee: The B.F. Goodrich Company, Akron, Ohio
[21] Appl. No.: 388,883
[22] Filed: Aug. 3, 1989

Related U.S. Application Data

[63] Continuation-in-part of Ser. No. 360,688, Jun. 2, 1989, abandoned.

[51] Int. Cl.⁵ .............................................. F16L 3/04
[52] U.S. Cl. .................................. 285/158; 285/222; 285/362.5; 285/915
[58] Field of Search ................. 285/205, 382.4, 382.5, 285/222, 155, 158, 915; 137/318; 29/509, 523

[56] References Cited
U.S. PATENT DOCUMENTS

| | | | |
|---|---|---|---|
| 550,914 | 12/1895 | Hoyt | 285/158 |
| 2,137,223 | 11/1938 | Baxter | 285/158 |
| 2,690,279 | 9/1954 | Ward | 137/318 X |
| 2,823,724 | 2/1958 | Gill | 285/362.5 X |
| 3,754,731 | 8/1973 | Mackal et al. | 285/222 X |
| 3,984,132 | 10/1976 | Sarson | 285/222 |
| 3,986,734 | 10/1976 | Davis | 285/158 |
| 4,615,545 | 10/1976 | Cruse | 285/158 X |

Primary Examiner—Dave W. Arola
Attorney, Agent, or Firm—Joseph Januszkiewicz

[57] ABSTRACT

A tubular connector consisting of a longitudinally extending tubular member having a central passageway extending therethrough with the one end of such central passageway being threaded. An annular flange on the intermediate exterior portion divides the tubular member into an upper portion and a lower portion, which lower portion has a thin walled portion that extends from the flange to the one threaded end portion. The upper exterior portion of the tubular member has axial spaced barbs that are circumferentially extending to facilitate connection to a hose. The thin walled lower portion is subject to being upset for cooperation with the flange to secure the tubular connector to a thin walled member. The lower exterior portion of the tubular member may also have circumferentially extending barbs to provide connection for a second hose.

13 Claims, 3 Drawing Sheets

TUBULAR CONNECTOR

This is a continuation-in-part of copending application(s) Ser. No. 360,688 filed on June 2, 1989, abandoned.

BACKGROUND OF THE INVENTION

This invention is directed to a tubular connector and more particularly to a fluid tubular connector for use on any tubular pipe, conduit or manifold.

In the installation of tubular connectors on pipes, conduits, manifolds and other receptacles, special effort is made to design the supporting structures such as the receptacles, manifolds or connectors to facilitate and expedite the installation to assure that no leakage will occur. Ordinarily the manifold, conduit or receptacle that required a connector was sufficiently thick that only a hole needed to be drilled thereinto and thence the hole was tapped to provide a screw threaded connection. As the manifolds, conduits and receptacles became thinner in cross section it became more difficult to provide a leakproof connection or to even assure that an installation could be made. Particular problems that occurred with the thin walled construction was that it was difficult to install the tubular connector without exerting force and therefore special complex connectors had to be used. In the instant invention, the tubular connector is particularly adapted for such thin walled cross sectioned installation in a facile manner yet permitting the use of high torque for installation while assuring a fluid tight fit. A further advantage of the instant connector is that it may be installed in a plain, drilled hole where wrench clearance is not required to effect the interconnection and installation. The present invention also permits the installation of a connector to a thin walled structure that permitted fluid connection thereto from both sides of the structure as well in a facile manner. Thus the connector could be used in a small low clearance working areas of installation.

SUMMARY OF THE INVENTION

A tubular connector for a fluid line consisting of a tubular member with an annular flange on the intermediate exterior portion thereof and with a central passageway extending therethrough. That portion to one side of the flange has barbs on the exterior thereof for connection to a hose and that portion to the other side of the flange has a lower internal threaded end portion with a smooth thin walled portion located between the flange and the threaded portion to facilitate the upsetting of such section for securing the connector to the fluid line or manifold. Alternatively, the other side portion also could have an outwardly projecting extension with external means to provide an additional means for connection to a conduit.

DETAILED DESCRIPTION

Figure 1:
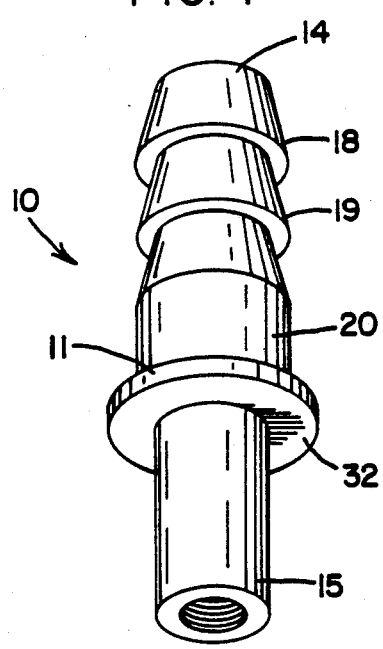
FIG. 1 is a perspective side elevational view of the invention.
Figure 3:
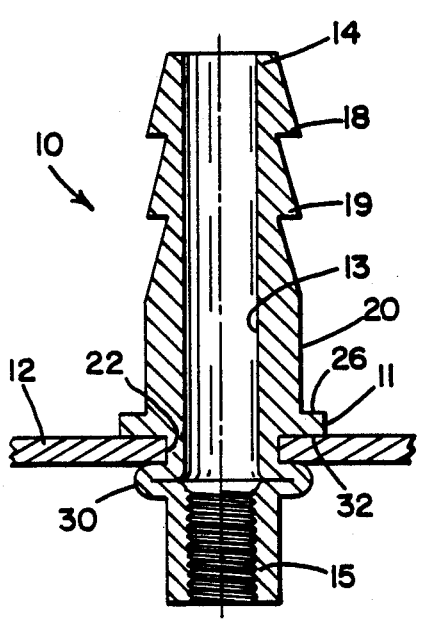
FIG. 3 is a longitudinal sectional view of the hose connector shown installed in the wall of a conduit.
Figure 4:
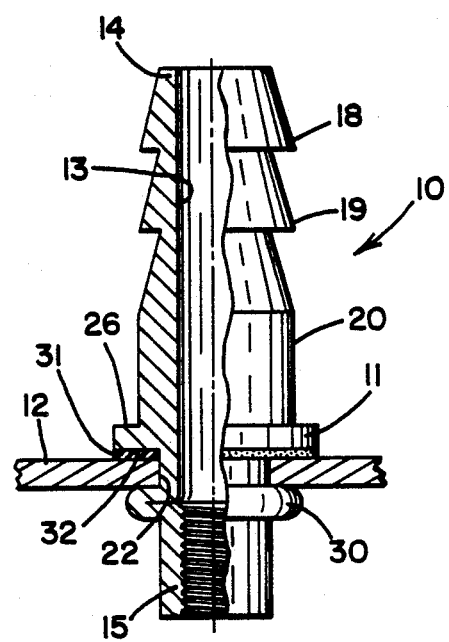
FIG. 4 is longitudinal view of the installed connector partly in cross section similar to that shown in FIG. 3 but with an annular seal.
Figure 6:
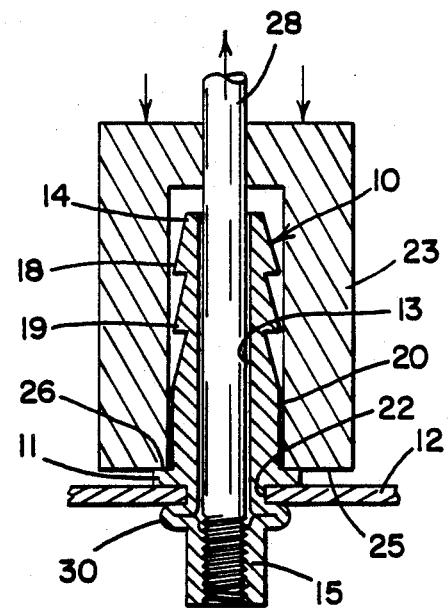
FIG. 6 is a longitudinal sectional view of the installed hose connector showing an anvil and draw rod for securing the hose connector to the shell of a conduit or similar device.

Referring to the drawings wherein like reference numerals refer to like elements in the several views, there is shown in FIG. 1 a longitudinally extending hose connector 10 with an annular flange 11 at the intermediate portion thereof. The hose connector is for installation on the wall 12 of a manifold or conduit as shown in FIGS. 3, 4 or 6.

Figure 2:
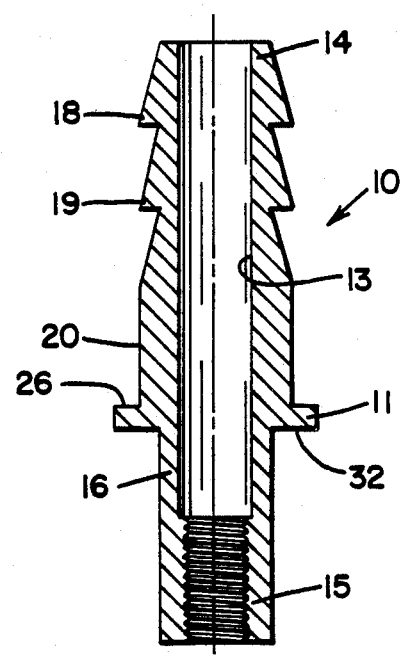
FIG. 2 is a longitudinal sectional view through the hose connector of the invention.

The hose connector 10 has a narrow central longitudinally extending passageway 13 extending from one end 14 to an internally threaded portion 15 located at the other end. The inside wall surface of the passageway is smooth from the one end 14 to the threaded portion 15. The wall thickness of hose connector 10 between the flange 11 and the threaded portion 15 is much thinner in cross section than the wall thickness of the threaded portion 15 to facilitate the upsetting of such thin walled portion designated 16 in FIG. 2. Such passageway 13 from the one end 14 to the threaded portion 15 is of the same internal diameter for the full length thereof. The exterior of the hose connector 10 from the one end 14 to the flange 11 has a pair of axially spaced circumferentially extending barbs 18 and 19 followed by a cylindrical portion 20 adjacent to the annular flange 11.

To effect the installation of the hose connector to the wall 12 of a manifold or conduit, a hole 22 is first drilled through the wall at the desired location. The hose connector 10 is then positioned into the hole 22 such that the flange 11 of the hose connector 10 rests against the exterior surface of the wall 12 adjacent to the hole 22 and the threaded portion 15 projects into the chamber of the conduit or manifold. As shown in FIG. 6, a tubular anvil 23 is then positioned onto that portion of the hose connector that projects outwardly away from the wall 12 such that bottom annular surface 25 of the anvil 23 abuts the top annular surface 26 of flange 11. A draw rod 28 of an upsetting tool is then threadedly connected to the threaded portion 15 of the hose connector 10 as illustrated in FIG. 6. As the draw rod 28 is moved upwardly relative to the wall 12 adjacent to hole 22, a slight downward pressure is maintained on the anvil 23 so that on continued upward movement of draw rod 28, such draw rod 28 will cause the thin walled portion 16 that lies between the flange 11 and the threaded portion 15 to buckle forming an annular bulged portion 30, which bulged or buckled portion 30 in cooperation with the flange 11 captively secures the hose connector 10 to the wall 12 as shown in FIGS. 3 and 6. The longitudinal length of the thin walled portion of the hose connector 10 between flange 11 and the threaded portion 15 is sufficiently long to permit the buckling thereof to secure the connector to the wall 12 of the manifold or conduit. An annular seal or gasket 31 may be placed into abutting contact with the annular surface 32 (FIGS. 1 and 2) on flange 11 prior to introduction into the hole 22 in the wall 12, such that upon upsetting of the thin walled portion 16, a secure leakproof connection is made wherein such annular seal 31 is firmly engaged by flange 11 and wall 12. In lieu of the annular seal 31 a preapplied sealant may be adhered to the bottom surface 32 of flange 11 and to the adjacent tubular surface 16 to make the installation easier in the field. Such sealant may be substantially identical to seal 31.

Figure 5:
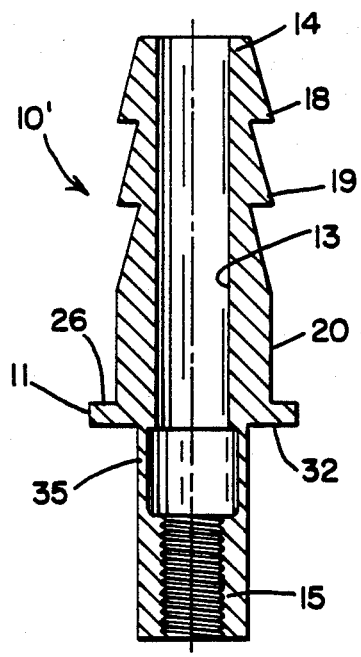
FIG. 5 is a longitudinal sectional view of a modified form of the hose connector.

A modification of the invention is shown in FIG. 5 wherein the hose connector 10' is substantially identical to the above described connector which portions have the same reference numerals except that the thin walled portion 35 located between the flange 11 and the threaded portion 15 is substantially thinner than the threaded portion 15 to facilitate the upsetting action of such connector to make such hose connector 10' particularly useful in thin walled conduit or manifold structures. As seen in FIG. 5, such thin walled portion is less than one-half the thickness of the threaded wall portion 15.

Figures 7, 8:
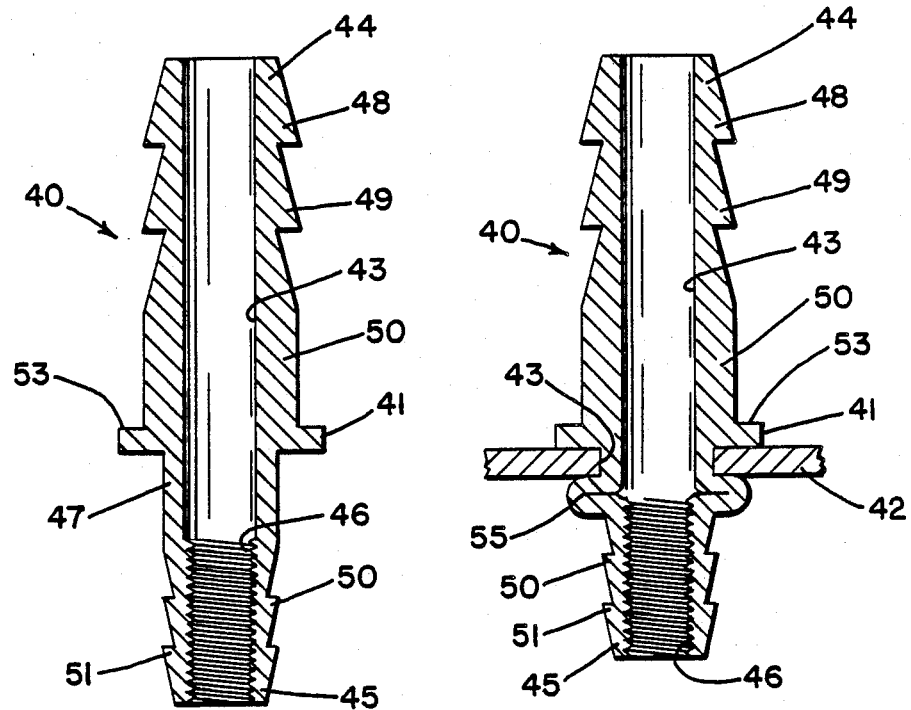
FIG. 7 is a longitudinal sectional view of a further modification of the hose connector taken through the hose connector per se.
FIG. 8 is a longitudinal sectional view of a hose connector of FIG. 7 in the installed condition showing an anvil and draw rod for securing the hose connector to the wall of a receptacle or other similar device.

A further modification of the invention described above is shown in FIGS. 7 and 8 wherein there is shown in FIG. 7 a longitudinally extending hose connector 40 with an annular exterior flange 41 at the intermediate portion thereof. As shown, the hose connector 40 is for installation to the wall 42 of a receptacle as shown in FIG. 8.

The hose connector 40 has a narrow central longitudinally extending passageway 43 extending from one end 44 to the other end 45, which other end has an internally threaded bore portion 46. The inside wall surface of the passageway 43 is smooth from such one end 44 to the threaded portion 46. The wall thickness of the hose connector 40 between the flange 41 and the threaded portion 46 is much thinner in cross section than the wall thickness of the threaded portion 46 to facilitate the upsetting of such thin walled portion designated 47 in FIG. 7. Such passageway 43 from the one end 44 to the threaded portion 46 is of the same internal diameter for the full length thereof. The respective exterior ends 44 and 45 of the hose connector 40 have axially spaced circumferentially extending barbs followed by respective cylindrical portions 50 and 47 adjacent to the annular flange 41. There are a pair of barbs 48 and 49 for the hose end 44 and a pair of barbs 51 and 52 for the hose end 45. Thus, with the plural barbs on both sides of the annular flange 41, there is provided the means to connect separate conduits to both sides of the hose connector 40 in a facile and convenient manner.

To effect the installation of the hose connector 40 to the wall 42 of a receptacle, a hole 53 is drilled through the wall at the desired location. The hose connector 40 is then positioned into the hole such that the flange 41 rests against the exterior surface of the wall 42 adjacent to the hole 43 and the threaded portion 46 and the barbs 50 and 51 project on the other side of the wall 42. The upsetting of the hose connector 40 is done in the same manner as described above in respect to the hose connector 10 and as shown in FIG. 6 wherein a tubular anvil is positioned into the top annular surface 53 of flange 41. A draw rod similar to rod 28 of an upsetting tool can then be threadedly connected to the threaded portion 46 of the hose connector 40 and moved upwardly relative to the wall 42. As downward pressure is maintained on such anvil that is in contact with the flange 41, continued upward movement of the draw rod will cause the thin walled portion 47 that lies between the flange 41 and the threaded portion 46 to buckle forming an annular bulged portion as shown in FIG. 8 and as described and shown in the first described embodiment. Such thin walled portion 47 as seen in FIG. 7 is designated a bulged portion 55 in FIG. 8 for clarity of references. As described above, an annular seal or gasket may be placed into abutting contact with bottom annular surface of the flange 41 prior to introduction of hose connector 40 into the hole 43 of wall 42 to provide a leakproof connection. Thereafter a hose or conduit can be connected to the respective barbed ends 44 and 45 of the hose connector 40.

It will be apparent that, although a specific embodiment and modifications thereof have been described in detail, the invention is not limited to the specifically illustrated and described constructions since variations may be made without departing from the principles of the invention.

I claim:

1. A tubular connector for a fluid line (for connection to a thin walled member), said connector consisting of a longitudinally extending tubular member, said member having an annular flange along the intermediate external portion of said tubular member, said flange having an annular face, a central passageway extending longitudinally from one end of said connector to the other end of said connector, the portion of said passageway extending from said flange to said one end of said tubular member having a smooth walled portion and a threaded portion, said smooth walled portion lying closer to said flange than said thread portion, said threaded portion lying adjacent to said one end, the wall thickness of said smooth walled portion that lies between said flange and said threaded portion of said tubular member being thinner in cross-section than said threaded portion to facilitate upsetting of said thin smooth walled portion, and the external end portion of said tubular member lying adjacent to the other end of said tubular member having a plurality of axially spaced circumferentially extending barbs to facilitate the locking onto a hose.

2. A tubular connector as set forth in claim 1 wherein said annular flange of said tubular connector has an annular gasket abutting said annular face thereof to provide a sealing means.

3. A tubular connector as set forth in claim 2 wherein said barbs are frusto-conical in shape.

4. A tubular connector as set forth in claim 3 wherein said thin smooth walled portion is substantially thinner in cross section relative to said smooth walled portion.

5. A tubular connector as set forth in claim 4 wherein said thin walled portion is less than one half the wall thickness of said threaded portion.

6. A tubular connector as set forth in claim 1 wherein said annular flange of said tubular connector has a sealant adhered to said annular face to provide a sealing means when installed onto a conduit or manifold.

7. A tubular connector as set forth in claim 1 wherein said smooth walled portion that lies between said flange and said threaded portion of said tubular member is a bulged upset portion that cooperates with said flange to lock said tubular member to said thin walled member.

8. A tubular connector as set forth in claim 1 wherein the external end portion of said tubular member lying adjacent to said one end of said tubular member having a plurality of axially spaced circumferentially extending barbs to facilitate attachment onto a hose.

9. A tubular connector as set forth in claim 8 wherein said smooth walled portion that lies between said flange and said threaded portion of said tubular member is an upset portion that cooperates with said flange to lock said tubular member to said thin walled member.

10. A tubular connector for a fluid line consisting of a longitudinally extending tubular member with a passageway therethrough, a thin walled conduit with an external surface, a hole extending through said thin walled conduit for communicating with the interior of said conduit, said tubular member having an annular flange along the intermediate external portion thereof, said tubular member having a lower portion extending through said hole and into said conduit with said annular flange in abutting contact with said external surface adjacent to said hole, said tubular member having an upper portion that lies externally relative to said conduit, said passageway in said lower portion adjacent its end being threaded, the lower portion of said tubular member lying between said flange and said threaded portion being a smooth walled portion, said smooth walled portion that lies between said flange and said threaded portion having a thinner wall cross-section relative to said threaded portion to facilitate an upsetting action, said smooth walled portion having an annular flanged bulged portion formed by an upsetting action that abuts said conduit on the inner surface thereof opposite to said external surface adjacent said hole, and said upper portion of said tubular member having a plurality of barbs for attaching said tubular connector to a hose.

11. A tubular connector as set forth in claim 10 wherein said barbs are frusto-conical in shape.

12. A tubular connector as set forth in claim 11 wherein an annular deformable gasket is in captive abutting engagement between said annular flange and said external surface of said conduit adjacent to said hole.

13. A tubular connector for connection to a thin walled member, said connector consisting of a longitudinally extending tubular member, said member having an annular flange along the intermediate external portion of said tubular member, said flange having an annular face, a central passageway extending longitudinally from one end of said connector to the other end of said connector, the portion of said passageway extending from said flange to said one end of said tubular member having a smooth walled portion, the external end portion of said tubular connector lying adjacent to said one end having at least a pair of axially spaced circumferentially extending barbs, the external end portion of said tubular connector lying adjacent to said other end having at least a pair of axially spaced circumferentially extending barbs, said central passageway having a threaded portion lying adjacent to said one end, said tubular connector having a bulged portion lying between said threaded portion and said flange for setting against said thin walled member to secure said connector thereto.

* * * * *